United States Patent [19]

Fischer et al.

[11] Patent Number: 5,006,007

[45] Date of Patent: Apr. 9, 1991

[54] VIBRATION-PROOF COUPLING

[75] Inventors: Michael J. Fischer, Elizabethtown; W. Eugene Wilson, Columbus, both of Ind.

[73] Assignee: Reliance Electric Industrial Company, Greenville, S.C.

[21] Appl. No.: 367,260

[22] Filed: Jun. 16, 1989

[51] Int. Cl.$^5$ .................... B25G 3/24; F16B 2/02
[52] U.S. Cl. .................... 403/290; 403/373; 403/359
[58] Field of Search ........... 403/359, 341, 373, 374, 403/290

[56] References Cited

U.S. PATENT DOCUMENTS

| | | | |
|---|---|---|---|
| 98,144 | 12/1869 | Buckman | 403/373 |
| 101,824 | 4/1870 | Clark | 403/374 |
| 2,015,430 | 9/1935 | Matthews et al. | 403/359 X |
| 3,021,049 | 2/1962 | Settle | 403/374 X |
| 3,354,672 | 11/1967 | Klaeui | 403/373 X |
| 3,565,470 | 2/1971 | Nicol et al. | 403/373 X |
| 3,836,272 | 9/1974 | Duer | 403/359 |
| 4,565,464 | 1/1986 | Nilsson | 403/290 |
| 4,619,548 | 10/1986 | Kazaoka et al. | 403/359 X |

FOREIGN PATENT DOCUMENTS

| | | | |
|---|---|---|---|
| 1087472 | 8/1960 | Fed. Rep. of Germany | 403/341 |
| 373461 | 6/1973 | U.S.S.R. | 403/359 |

OTHER PUBLICATIONS

Cover Sheet, and pp. C2-36 and C2-37 of "Dodge & Waldron Couplings" by Reliance Electric.
Cover Sheet, and pp. G2-88 and G3-76 of "Dodge Gear Engineering Catalog vol. 2" by Reliance Electric.
Dodge Bulletin 20G, pp. 20-3 and 20-4, by Reliance Electric.
Bulletin 40E, Inside front cover, by Reliance Electric.
Reliance Electric Bulletin G-2565 entitled "Reeves Vari-Speed Motor Pulleys".
Instruction Manual for Dodge APG C-Face Speed Reducer, p. 24, by Reliance Electric.
"Ringfeder", Brand Bulletin W100-2 For "Shaft-Hub Locking Devices", p. 2.
Excerpt from Magnalloy Coupling Company's Catalog No. 8410 for "Magnalloy Flexible-Drive Coupling".
Lovejoy Catalog for Centaflex Centaloc Spline Shaft Clamping Hub, p. 6, Lovejoy Coupling Company, 2655 Wisconsin Ave., Downers Grove, Ill. 60515.
Lovejoy Coupling Company Catalog, LJ114, p. 9.
Martin Catalog No. 50, pp. 10 and 11, Martin Sprocket & Gear, Inc., 3100 Sprocket Dr., Arlington, Tex. 76004.

Primary Examiner—Andrew V. Kundrat
Attorney, Agent, or Firm—Dority & Manning

[57] ABSTRACT

A coupling arrangement is made vibration-proof based on mating male and female spline members. The male spline member is incorporated into the outside diameter of a shaft, while the female spline member is incorporated into the bore of a coupling hub. The spline shaft is received in the spline bore. The coupling hub includes two perpendicular cuts through the splined portion thereof, to permit selected radially-inward compression of such portion for shrink fitting thereof onto the spline shaft. The outside diameter of such coupling hub splined portion is also adapted for receiving a clamping collar, which may be tightened to compress the hub and effect a tight fit with the splined shaft, thereby facilitating the application of effective clamping force, while eliminating all play and fretting corrosion between the shaft and coupling hub.

11 Claims, 2 Drawing Sheets

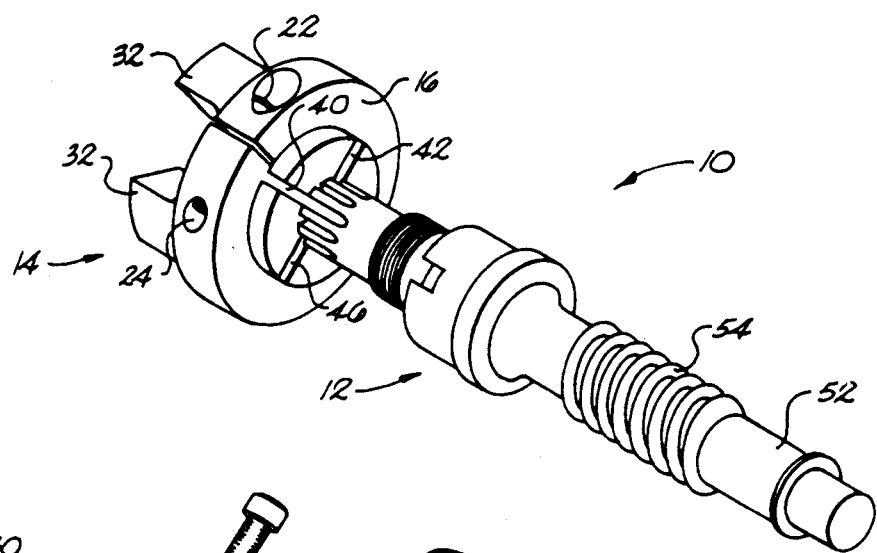
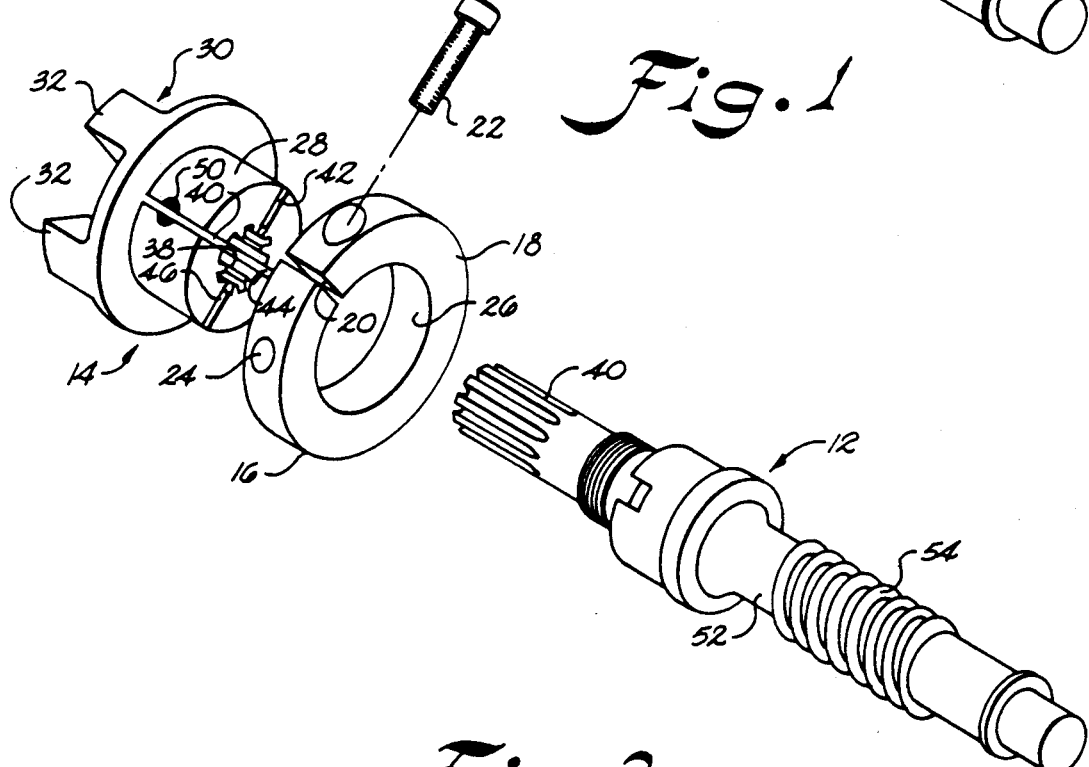

VIBRATION-PROOF COUPLING

BACKGROUND OF THE INVENTION

The present invention generally concerns an improved coupling arrangement, and in particular concerns a vibration-proof splined coupling arrangement incorporating a clamping collar.

A most common need in drive applications is an effective coupling arrangement between the drive or power source (such as the output shaft of an electric motor), and the load to be driven (such as a gear reducer unit, conveyor belt, sprocket, or the like). In many instances, it is highly desirable, if not altogether an absolute requirement, that the load to be driven be removably engaged (i.e., separable) from the drive power unit. In other words, for maintenance, redesign, or other purposes, it is necessary or desirable to be able to de-couple the motor or other drive source from its load. Once de-coupled, it is also often desirable to effect whatever repairs, redesign, or reconfiguration desired in a minimum amount of time, to prevent extraordinary loss of output or production from the driven load, which may be part of a commercial process or the like.

Numerous different coupling arrangements are well known to those of ordinary skill in the art. For example, one approach is to make use of tapered bores mated with tapered bushings or the like, which results in an interference fit. Typically, in such arrangements one member may be extracted from the other through the use of jacking screws. Though widely and successfully practiced for numerous applications, existing field equipment and parts in some instances are simply not designed for use of tapered/interference-fit technology without total replacement or reworking of such existing parts.

Another approach totally separate from the interference-fit technologies involves use of matable splined shaft and splined bore members. In such cases, since an interference fit is not intended, several thousandths of an inch (0.001") clearance or the like is preferably provided, to permit ready alternate introduction and removal of the splined members, one to another.

Such splined technology, like the tapered/interference-fit technology, is generally widely used for various applications, and has experienced considerable success. On the other hand, the present invention recognizes and addresses a particular instance in which highly undesirable and destructive fretting corrosion occurs between the splined members, even to the point of resulting in a coupling failure, a worst case scenario.

Frequently, in particular coupling arrangements, the male splined member will be formed as a shaft, which in turn is integrally operatively incorporated into a commercial process. Obviously, certain commercial processes are more cost sensitive to downtime than others; but, in any event, it is highly desirable to minimize downtime. If there is a coupling failure due to fretting corrosion which can be avoided by an improved design, then perhaps an expensive input shaft will not need frequent replacing. On the other hand, if a drive motor or other component fails, necessitating separation of the drive motor from the load, the presence of fretting corrosion can render difficult, if not impossible, such separation. Such separation problems can result in even greater downtime than if the entire shaft were being replaced, such as in the first instance mentioned above.

Due to the relatively minute amount of clearance typically between splined members, the amount of play between such coupling members is likewise very minute. Thus, in an overwhelming number of applications, such splined coupling technology performs in a totally adequate manner, during both driven, coupling operations, and de-coupling operations. However, the present invention recognizes and addresses that certain types of loading conditions can nonetheless result in fretting corrosion to splined couplings. In some instances, the entire spline supported on the shaft can be eaten away by the iron oxide or red rusty powder which forms from such fretting corrosion.

The foregoing corrosion problems have been noted particularly in applications involving repetitive cycling of a system under one or more of heavy reversing conditions, frequent start/stop conditions, or other rapidly-alternating accelerating/decelerating loading conditions. In such instances, which typically comprise a very small percentage of most commercial uses, the present invention recognizes that the very small amount of play between conventional male and female splined coupling members ultimately results in the above-mentioned fretting corrosion.

Various solutions to eliminating such small amounts of play and backlash have been attempted. In one such instance, a set screw radially situated through the circumference of the female splined member is brought into contact with the male splined member. Not only does such an arrangement result in pitting and other damage to the splining of the male member, it nonetheless ultimately shakes loose under the above-mentioned heavy-duty, repetitive-cycling loading conditions.

In one variation to such set screw arrangement, the Lovejoy Coupling Company of Downers Grove, Ill. 60515, provides a splined shaft clamping hub known as the "Centaloc". Such technique involves use of a slot situated slightly above and parallel to the spline bore. One or two set screws are fitted perpendicularly into such slot. During torquing of the set screws, the spline shaft is not touched by the set screws, but instead is supposedly "wrapped" with a clamping force, which can be subsequently removed by loosening the set screw or screws. One particular problem with such design is that is has been found that providing adequate clamping force for clamping the spline shaft can result in literal breakage of the wrench used to torque the set screw(s). Even if the wrench does not break, it is difficult to achieve the necessary clamping force, or to know when such adequate force is effected.

For some users, the only available in-field expedient solution to the above-discussed problems has been to use "Loctite" or similar metallic glue products to bind the two splined members together. While such "brute force" technique obviously eliminates fretting corrosion by eliminating all play between the splined coupling members, it also just as obviously eliminates any possibility of subsequently separating such coupling members without damage thereto, and hence is clearly not a general, long-term practical solution to the above-mentioned problems.

As mentioned above, tapered/interference-fit technology may be one effective solution to the noted technical problems, but can be cost prohibitive to implement (i.e., retrofit) once a splined technology system is in place.

SUMMARY OF THE INVENTION

The present invention recognizes and addresses the foregoing problems, and others, concerning coupling arrangements. Thus, broadly speaking, one general object of the present invention is to provide improved coupling arrangements. More particularly, a present primary object is to provide improved splined coupling arrangements, which eliminate or minimize fretting corrosion, while permitting easy application and removal (i.e., alternate joining and separation) of the coupling arrangement.

A more particular present object is to provide an improved splined drive coupling arrangement which eliminates virtually all free play between the respective coupling elements, even when the coupling arrangement is subjected to adverse conditions, such as repetitive cycles of reversing directions, or alternating acceleration/de-acceleration, or the like.

Another more particular present object is to provide an improved splined coupling arrangement which makes use of a conveniently actuated clamping collar device, to facilitate coupling and subsequent de-coupling operations, while still providing for the above-indicated desired elimination of free play (and fretting corrosion) between the respective coupling members.

Yet another present object is to provide an improved drive coupling arrangement which achieves the foregoing advantages and objects, while yet making use of existing splined technology and parts as much as possible so as to minimize the cost of introducing such improvements. By incorporating the present invention into standard constructions and arrangements as much as possible, the object of enabling practice of the present invention most economically is best achieved.

In satisfying the present object of eliminating the relatively minute amount of play between conventional splined coupling members, it is a further present object to make use of a clamping collar arrangement for ease of applying effective clamping force, as well as de-coupling effort. It is also a present object to provide an improved splined coupling arrangement which is readily adaptable to a wide range of sizes, as well as various applications by varying the construction of coupling hubs (i.e., female splined members) used herewith for engagement with different operative loads and/or drive devices. Likewise, it is a present object to provide improved splined coupling arrangements such as the foregoing, which are operative with a male splined member which may assume various shapes and constructions for engagement and use in different applications, such as with various operative loads and/or drive devices.

Additional objects and advantages of the present invention are set forth, or will be apparent to those of ordinary skill in the art, from the detailed description which follows. Also, it should be appreciated that modifications and variations to the specific illustrated and discussed features hereof may be practiced in various embodiments and constructions of this invention without departing from the spirit and scope thereof, by virtue of present reference thereto. Such variations may include, but are not limited to, substitution of equivalent means and features for those shown or discussed, and the reversal of various parts, or the like.

Still further, it is to be understood that different embodiments, as well as different presently preferred embodiments, of the present invention may include various combinations of presently disclosed features, or their equivalents. One exemplary such embodiment of the present invention relates to an improved coupling arrangement, comprising a male splined member, a coupling hub, and collar means. Preferably, the male splined member is adapted to be rotatively driven, such as a shaft. At least an axial portion of the coupling hub is provided with a bore formed with a female splined inside diameter for receipt of the male splined member. At least one slot is defined through the circumference of the hub in such axial portion thereof, and extends between the hub bore and the hub outside diameter. Such slot permits radial shrinkage of the coupling hub upon compression of the slot.

In the foregoing arrangement, the collar means is preferably adapted for receipt about the coupling hub axial portion with the male splined member received in the coupling hub bore, for selectively clamping the hub to the male splined member by compressing the slot so as to radially shrink the hub. With such construction, play between the hub and the said male splined member is eliminated so as to likewise eliminate fretting corrosion between such hub and member.

Another present exemplary embodiment concerns an improved, vibration-proof splined coupling, for eliminating fretting corrosion due to repetitive cycling of heavy, reversing loads and/or rapidly-alternating accelerating/de-accelerating loads coupled to a drive power source therewith. Such construction of a present coupling may comprise a shaft with a splined end; a mating splined coupling member adapted for fitting thereof on the shaft splined end, such coupling member having a pair of mutually perpendicular slots formed in the portion thereof fitting over the shaft so as to permit a shrink fit of such portion to the shaft, such coupling member portion also having an outside diameter adapted for receipt of a clamping collar thereabout; and a clamping collar, receivable about the portion of the mating splined coupling member, for securing the shaft within the coupling member by radial clamping thereof, resulting in a shrink fitting of the coupling member to the shaft for the elimination of play and resultant fretting corrosion therebetween.

Yet another present construction comprising an exemplary embodiment of this invention includes a vibration-proof drive coupling, comprising a shaft having a male spline; a female coupling hub, having a mating female spline bore adapted for receiving the male spline shaft, and having a plurality of slots laterally situated therein to permit radial shrinkage thereof onto the shaft; and clamping collar means for being selectively secured about the coupling hub so as to shrink fit same onto the shaft, thereby eliminating all play and backlash between the shaft and the hub, even during repetitive cycling of heavy, reversing loads through said coupling.

Those of ordinary skill in the art will better appreciate the features and aspects of such embodiments, and others, upon review of the remainder of the present specification.

BRIEF DESCRIPTION OF THE DRAWINGS

A full and enabling disclosure of the present invention, including the best mode thereof, directed to one of ordinary skill in the art, is set forth in the remainder of the present specification, including reference to the appended figures, in which:

FIG. 1 is a perspective view of an assembled exemplary coupling arrangement in accordance with the present invention;

FIG. 2 is an exploded, perspective view of the exemplary embodiment of the present invention, as represented in present FIG. 1;

Figure 3:
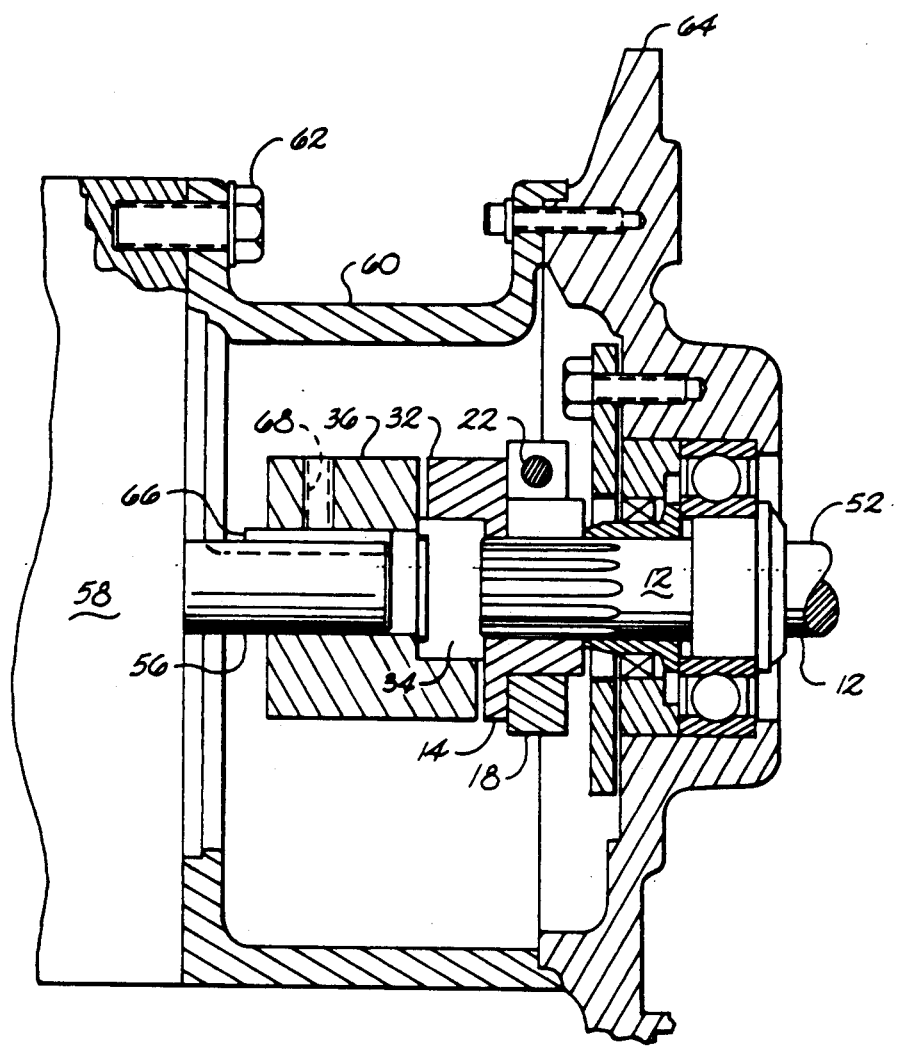
FIG. 3 is a side, partial, cross-sectional view of one configuration of the exemplary embodiment of present FIG. 1, during use thereof in a coupling arrangement operatively associated with a motor.

Repeat use of reference characters throughout the present specification and appended drawings is intended to represent same or analogous features or elements of the present invention.

DETAILED DESCRIPTION OF THE PREFERRED EMBODIMENT

Those of ordinary skill in the art will appreciate that the present figures and their corresponding description are merely illustrative of exemplary presently preferred embodiments of the present invention, rather than limitative of the broader aspects of such invention. FIGS. 1 and 2 represent assembled and exploded views, respectively, of an exemplary improved coupling arrangement 10 in accordance with this invention. A male splined member 12 is matable with a corresponding female splined member 14. Collar means 16 are received about a particular axial portion of female member 14, for clamping such female member about male member 12 when assembled as represented in present FIG. 1. Collar means 16 as presently represented is one preferred clamping device, but others may be used. In the illustrated preferred embodiment, collar means 16 includes an annular member 18 having a radial slot 20 through the circumference thereof, and a tightening screw 22 which cooperates with a tapped hole 24 to controllably actuate clamping effect with the collar means.

Collar means 16 is adapted for placement of its inside diameter 26 about the outside diameter 28 of a particular axial portion of female member 14. Member 14 may be considered as a coupling hub, and have other axial portions thereof, such as generally region 30, adapted for operative engagement with various rotatable loads, or with various rotatable drive mechanisms. In such instances, the outside diameter 28 of the axial portion which cooperates with collar means 16 is preferably of a smaller diameter than the outside diameter of region 30. Of course, variations may be practiced in accordance with the present invention, so long as outside diameter 28 is adapted for receiving a clamping collar arrangement. In the particular embodiment represented, region 30 includes projections or fingers 32 which cooperate with a coupling spider 34, and corresponding motor coupling hub 36, as represented in present FIG. 3.

The axial portion of coupling hub or female member 14 having an outside diameter 28 also has a splined central bore 38 situated axially therein, for receipt of corresponding male splined member 40. Further in accordance with this invention, such axial portion of hub 14 includes at least one slot defined through the circumference thereof, and extending between hub bore 38 and hub outside diameter 28. Such slot permits radial shrinkage of the coupling hub upon compression of the slot, such as with the addition of a clamping collar mechanism, e.g. collar means 16.

Figure 4:
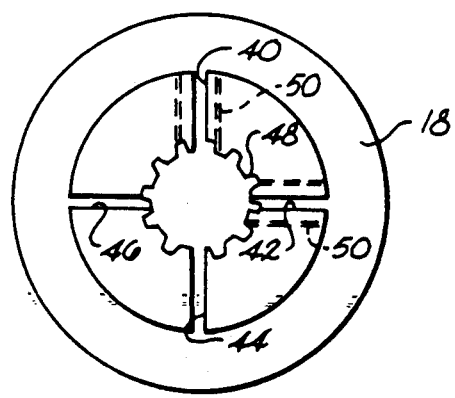
FIG. 4 is a cross-sectional view of an exemplary coupling hub member and clamping collar in accordance with the present invention.

With reference to FIGS. 1, 2, and 4, it is well illustrated that the female splined member preferably has two mutually perpendicular cuts therethrough, defining for example four separate slots 40, 42, 44, and 46. The presence of such slots renders axial portion 28 radially shrinkable by compression of the slots. As particularly well illustrated in FIG. 4, such slots result in division of the corresponding axial portion of hub 14 into respective quadrants, all of which are fitted with female splined teeth 48. Alternatively, oppositely situated pairs of slots, such as 40 and 44, and 42 and 46, may be viewed as, and considered to be, continuations of the same lateral cut or slot in the given axial portion of hub 14 which is adapted for receiving male splined member 40. As mentioned above, such initial receipt is not an interference fit, but is preferably thereafter tightened with placement and clamping actuation of collar means 16 about axial portion 28.

As also discussed above, it is one object of the present invention to permit practice thereof, as much as possible, even with previously existing components (though modified in accordance with this invention). Thus, some coupling hub arrangements 14 available in the marketplace may already be formed for the introduction of set screws or the like into threaded holes 50, as represented in solid line in present FIG. 2, and dotted line in present FIG. 4. While such structures or features may be present in given embodiments of the present invention, their use is neither necessitated nor desired for the full practice of the present invention. On the other hand, their presence is not precluded, particularly if they were previously existing in a coupling hub part subsequently modified for operation or practice of the present invention.

For clarity in illustration, the representative cross-section of present FIG. 4 does not include representation of the male splined member which would ordinarily be included in a given embodiment of the present invention, nor specific details of how clamping force is actuated with annular member 18. Those of ordinary skill in the art will appreciate, and be able to use without disclosure of additional detail, various alternative clamping means or mechanisms.

Also as discussed above, the male splined member 12 may assume, or be integrally incorporated into, various structures such as a shaft element 52. Such shaft may incorporate a worm gear 54, or other features permitting operative engagement thereof with various rotatable loads and/or rotatable driving sources. One exemplary configuration of a coupling arrangement 10 in accordance with the present invention during use thereof is represented by the illustration in present FIG. 3. In such illustration, female member or coupling hub 14 is arranged for association with the output shaft 56 of an exemplary motor 58. Such motor may be utilized with a C-face adaptor 60, which is well known to those of ordinary skill in the art, and which is secured to the motor frame with a bolt package 62 or the like. Male member 12 may in such exemplary application of present FIG. 3 be associated with a gear reducer unit 64, which is variously operatively engaged with shaft 52, though not shown in detail in FIG. 3 since only conventional aspects of a gear reducer unit are involved, all well known to those of ordinary skill in the art.

More particularly with reference to the present coupling arrangement as used in the motor/gear reducer unit application represented in present FIG. 3, a tightening screw 22 of an annular collar member 18 is secured about the splined portion of a coupling hub 14 for securing a tight fit with the male splined member 12 received therein. As previously discussed, the engagement portions (such as extension 32) of coupling hub 14 are further associated with coupling spider 34 and motor coupling hub 36. Such motor coupling hub may be associated with a key structure 66 and set screw arrangement 68 for securement to motor shaft 56, as well known to those of ordinary skill in the art. Thus, the improved coupling arrangement in accordance with the present invention permits and provides for the passage or transfer of rotatable energy between motor 58 (through shaft 56, female coupling member 14, and male coupling member 12) to a load associated with shaft 52. It should be apparent to those of ordinary skill in the art that numerous conventional aspects of the overall drive application and coupling arrangement shown in FIG. 3 are not discussed in detail, since already well known and understood to those of ordinary skill.

It should be further apparent to those of ordinary skill in the art that various modifications and variations may be practiced, without departing from the spirit and scope of the present invention. For example, it is preferred that involute splined features be practiced, though flat tooth features may also be practiced in certain embodiments of the present invention. Likewise, various materials, such as sintered iron or fatigue proof steel, may be practiced, with substitutions of various materials being selected and made as needed to fit various drive applications.

In some instances, it may be possible to reduce the use of hardened materials or hardening steps normally associated with some conventional coupling arrangements, in light of the improved overall strength and durability of coupling arrangements in accordance with the present invention. Likewise, to accommodate practice of the present invention with particular applications, either or both of the present male and female splined members may be alternately practiced in combination or use with a variety of rotatable loads and/or drive sources. Also, while set screw placements are illustrated, it is to be understood that such are not necessary nor precluded, as are other additional features not precluded when practicing the present invention, which is recited more particularly in the appended claims.

What is claimed is:

1. An improved coupling arrangement, comprising:
    a substantially cylindrical non-deformable male splined member, adapted to be rotatively driven, such as a shaft;
    a coupling hub, having at least a substantially cylindrical axial portion thereof provided with a substantially cylindrical bore formed with a female splined inside diameter for receipt of said male splined member;
    at least one slot defined through the circumference of said hub in said substantially cylindrical axial portion thereof, and extending between said hub bore and the hub outside diameter, said at least one slot permitting radial shrinkage of said coupling hub upon compression of said slot; and
    collar means, adapted for removable receipt about the outside diameter of said coupling hub axial portion with said male splined member received in said coupling hub bore, for selectively clamping said hub to said male splined member by compressing said slot for radially shrinking said hub, whereby play between said hub and said male splined member is eliminated so as to likewise eliminate fretting corrosion between such hub and member while permitting said hub and said male splined member to be subsequently decoupled when desired.

2. An improved coupling arrangement as in claim 1, wherein:
    said male and female splined features are of involute splining; and
    said coupling hub includes another axial portion adapted for operative engagement with a rotatable member, such as a rotatable drive force or a rotatable load to be driven.

3. An improved coupling arrangement as in claim 1, further including additional slots in said hub circumference, such that said hub includes a pair of mutually perpendicular slots through the entire circumference of said hub so as to divide said axial portion thereof into quadrants.

4. An improved coupling arrangement as in claim 3, wherein said hub axial portion includes a relatively reduced outside diameter, which is adapted for receipt of said collar means thereabout.

5. An improved coupling arrangement as in claim 1, wherein said male splined member comprises a shaft having one splined end thereof, and the remainder thereof adapted for use in a gear drive arrangement.

6. An improved, vibration-proof splined coupling, for eliminating fretting corrosion due to repetitive cycling of heavy, reversing loads and/or rapidly-alternating accelerating-decelerating loads coupled to a drive power source therewith, said coupling comprising:
    a shaft with a splined end;
    a mating splined coupling member adapted for fitting thereof on said shaft splined end, said coupling member having pair of mutually perpendicular slots formed in the portion thereof fitting over said shaft so as to permit a shrink fit of such portion to said shaft, such coupling member portion also having an outside diameter adapted for receipt of a clamping collar thereabout; and
    a clamping collar, removably receivable about said portion of said mating splined coupling member, for selectively securing said shaft within said coupling member by radial clamping thereof, resulting in a shrink fitting of said coupling member to said shaft for the elimination of play and resultant fretting corrosion therebetween;
    wherein said coupling member portion is situated generally on one end of said coupling member, and has a reduced outside diameter relative the reminder of said coupling member; and
    wherein said coupling member includes a spider-mating portion on an end thereof opposite said one end thereof, said spider-mating portion being adapted for drive fitting with a coupling spider and a motor coupling hub mounted on a motor, so that drive power from such motor may be transferred through said coupling member to said shaft.

7. A coupling as in claim 6, wherein said shaft splined end and mating splined coupling member have involute spline features.

8. An improved, vibration-proof spline coupling, for eliminating fretting corrosion due to repetitive cycling of heavy, reversing loads and/or rapidly-alternating accelerating/decelerating loads coupled to a drive power source therewith, said coupling comprising:

a shaft with a splined end;

a mating splined coupling member adapted for fitting thereof on said shaft splined end, said coupling member having a pair of mutually perpendicular slots formed in the portion thereof fitting over said shaft so as to permit a shrink fit of such portion to said shaft, such coupling member portion also having an outside diameter adapted for receipt of a clamping collar thereabout; and a clamping collar, removably receivable about said portion of said mating splined coupling member, for selectively securing said shaft within said coupling member by radial clamping thereof, resulting in a shrink fitting of said coupling member to said shaft for the elimination of play and resultant fretting corrosion therebetween;

wherein said shaft further includes a worm gear integrally formed thereon adapted for operative interaction with a gear reducer mechanism.

9. A vibration-proof coupling, comprising:

(a) a shaft having a male spline;

(b) a female coupling hub, having a mating female spline bore adapted for receiving said male spline shaft, and having a plurality of slots laterally situated therein to permit radial shrinkage thereof onto said shaft; and (c) clamping collar means for being selectively secured about said coupling hub so as to shrink fit same onto said shaft, thereby eliminating all play and backlash between said shaft and said hub, even during repetitive cycling of heavy, reversing loads through said coupling; wherein said male spline is involute;

said hub slots comprise four generally radial slots through the circumference of said hub, which divide a radially shrinkable portion of said hub into quadrants;

said hub radially shrinkable portion has a reduced outside diameter relative the remainder of said hub, and wherein said reduced outside diameter is adapted for receiving said clamping collar means; and further wherein the remainder of said hub is adapted for engagement with a coupling spider and a motor coupling hub, and wherein said shaft supports a worm gear thereon adapted for engagement with a gear reducer unit.

10. A vibration-proof drive coupling, comprising:

(a) a shaft having a male spline;

(b) a female coupling hub, having a mating female spline bore adapted for receiving said male spline shaft, and having a plurality of slots laterally situated therein to permit radial shrinkage thereof onto said shaft; and (c) clamping collar means for being selectively secured about said coupling hub so as to shrink fit same onto said shaft, thereby eliminating all play and backlash between said shaft and said hub, even during repetitive cycling of heavy, reversing loads through said coupling; wherein said clamping collar means comprises an annular member having one radial slot through the circumference thereof, the width of which slot may be selectively controlled with a tapped hole and corresponding tightening screw situated through the circumference of said annular member at an angle tangential thereto, whereby the clamping effect of said collar means may be controlled.

11. An improved coupling arrangement as in claim 1, wherein said collar means comprises an annular member having one radial slot through the circumference thereof, the width of which slot may be selectively controlled with a tapped hole and corresponding tightening screw situated through the circumference of said annular member at an angle tangential thereto, whereby the clamping effect of said collar means may be controlled.

* * * * *